United States Patent [19]

Weinhold

[11] Patent Number: 4,659,120
[45] Date of Patent: Apr. 21, 1987

[54] TUBE COUPLING

[76] Inventor: Karl Weinhold, Im Jagdfeld 43, 4040 Neuss, Fed. Rep. of Germany

[21] Appl. No.: 834,166

[22] Filed: Feb. 27, 1986

[30] Foreign Application Priority Data

Mar. 28, 1985 [DE] Fed. Rep. of Germany ....... 3511289

[51] Int. Cl.⁴ ............................................. F16L 15/00
[52] U.S. Cl. ....................................... 285/91; 285/243
[58] Field of Search ........................... 285/243, 91, 409

[56] References Cited

U.S. PATENT DOCUMENTS

| | | | |
|---|---|---|---|
| 3,181,901 | 5/1965 | Watts | 285/91 X |
| 3,866,956 | 2/1975 | Weinhold | 285/243 |
| 4,074,913 | 2/1978 | Weinhold | 285/243 X |
| 4,093,283 | 6/1978 | Weinhold | 285/243 |
| 4,152,016 | 5/1979 | Weinhold | 285/243 X |
| 4,496,176 | 1/1985 | Weinhold | 285/409 |

FOREIGN PATENT DOCUMENTS 2523338 9/1976 Fed. Rep. of Germany.
8330160 1/1984 Fed. Rep. of Germany.

Primary Examiner—Dave W. Arola
Attorney, Agent, or Firm—Sprung Horn Kramer & Woods

[57] ABSTRACT

The invention relates to a coupling for pipes, tubes or hoses comprising shell portions connected by means of joint bolts and also comprising a bolt lever locking mechanism. Substantial improvement is obtained by the fact that the concerned web portion is part of an outer guide flange extending in a circumferential direction which engages the annular groove at a distance of at least 90° before reaching the closing position. Integration of both web portions into a closed ring on the connecting flange represents a further advantage.

4 Claims, 3 Drawing Figures

TUBE COUPLING

BACKGROUND OF THE INVENTION

The present invention relates to a coupling for pipes, tubes or hoses.

In a coupling known from German Auslegeschrift No. 25 23 338 the web of a guide flange provided as guide means for the extension joint bolt of shell portions is designed as a radially extending fishplate comprising a radially outward opening slot. The joint bolt lever is guided within a second slot provided in a second guide flange web, said second slot comprising a radial section as well as a circumferential section. When the coupling is to be closed, the extension end of the shell portions joint bolt must be inserted into the radial slot. Simultaneously, the joint bolt lever has to be displaced within the second slot. This necessitates complicated handling.

In another hose coupling disclosed by German utility model No. 83 30 160 having the same generic features, the shell portion joint bolt extension is guided through an aperture provided in a web supported at the connecting flange. The assembly comprises neither radial nor circumferential clearance. In the closing position, the joint bolt lever engages a circumferentially open slot provided in a second web supported at said connecting flange. In said prior hose coupling the joint bolt lever is insufficiently guided over a substantial portion of the motion range between the opening and closing position. Before engaging the open slot there may occur axial displacement complicating the closing operation since it is necessary to manually adjust those parts which have to be brought into engagement.

On the basis of this prior problem it is an object of the present invention to improve a coupling of the described specific type in such a way that the structural parts ensuring axial adjustment are guided over a sufficient distance between opening and closing position in order to permit reliable and uncomplicated closing of the coupling device.

SUMMARY OF THE INVENTION

According to the invention the coupling comprises a pair of shells flexibly linked by means of an extension joint bolt, said pair of shells being provided with laterally extending clamping flanges and lockable by means of a lock consisting of a bolt lever and a spring mechanism. Said bolt lever is secured by means of a second extension bolt joint to one of the pair of shells, comprising a guide flange having the shape of a closed ring, said guide flange is connected to a connecting socket and located adjacent to said pair of shells and comprising an at least approximately radial web crossed by the extension joint bolt connecting said pair of shells, and forming an external guide extending in the circumferential direction for an extended end of the extension joint bolt linking said bolt lever with one of the pair of shells. Said extension joint bolt end comprises a guide head terminating in an annular groove and said guide flange engages said annular groove in a position spaced by at least 90° from the closing position. Said extended end of extension joint bolt is guided in the area of its annular groove on the radially outer surface of said guide flange. A recess having the shape of a radially extending oblong hole is provided in the area of web as a crosspassage for the extension joint bolt.

The coupling permits, long before the closing position is reached, safe guidance between the extension joint bolt of the bolt lever and the shell portion connected thereto and the connecting or guide flange. Interaction between the guide flange and the extension joint bolt begins already when the latter does not yet have to transmit any circumferential loads and therefore is not yet restricted in its movability.

Due to an appropriate clearance there also exists the possibility of radial motion compensation between the shell portions and their supporting flanges on one hand and the connecting flange on the other hand. This ensures, in particular in the case of hose couplings, that drive forces are substantially uniformly distributed over the circumference. But as in the prior embodiment of the coupling device disclosed by German utility model No. 83 30 160 the second web comprises a circumferentially open slot, it was not possible to provide for radial clearance since this would have complicated still further insertion of the extension joint bolt or its annular groove into the recess slot. But with the proposed tube coupling it is now possible that the recess provided in the first web as a passage aperture for the extension joint bolt be a radially extending oblong hole because despite the radial clearance provided by the oblong hole, guidance between the extension joint bolt and the guide flange may be maintained.

In order to provide the shell portions with a definite closing position during closing of the tube coupling, it is further suggested according to the invention that the guide flange be provided with a substantially radially outside extending projection acting as a circumferential end stop for the extension joint bolt in the closing position of the coupling device. In this function, said projection replaces the lower edge or end portion of the circumferentially extending slot of the second web of the prior coupling device.

For several reasons it will be useful to arrange such an end stop not only at one side but also at the opposite side of the shell portions. According to the invention, this is possible if at the side facing the guide flange the inner one of overlapping support flanges of the shell portions is dimensioned such that it rests on the extension joint bolt. Thus, when the closing position is reached, the shell portions are circumferentially supported at one side by the extension joint bolt and at the other side by support flanges appropriately dimensioned in the overlapping area.

The location of the circumferentially acting end stop in the overlapping area of the support flanges arranged at this side provides for still another advantage if in the overlapping area the shell portion support flanges are provided with aligned apertures for insertion of a locking pin. The adjustment of the end or closing position ensures that said apertures perfectly concord with each other, thus facilitating insertion of the locking pin.

BRIEF DESCRIPTION OF THE DRAWINGS

An example of the invention is illustrated by the accompanying drawings in which.

DETAILED DESCRIPTION OF THE INVENTION

Figure 1:
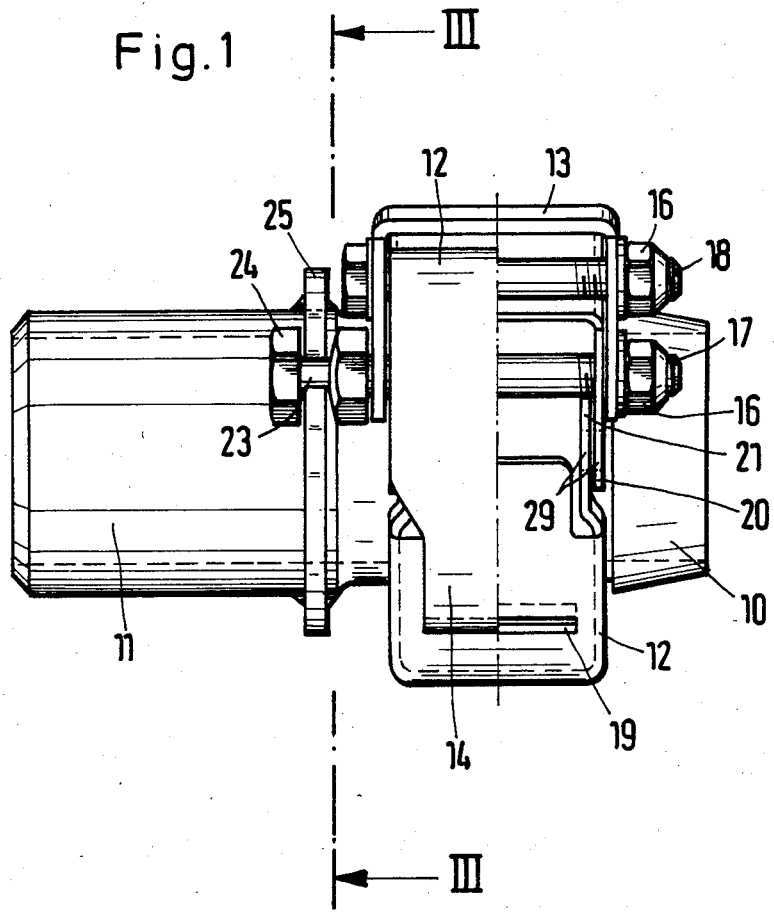
FIG. 1 is a side elevation.
Figure 2:
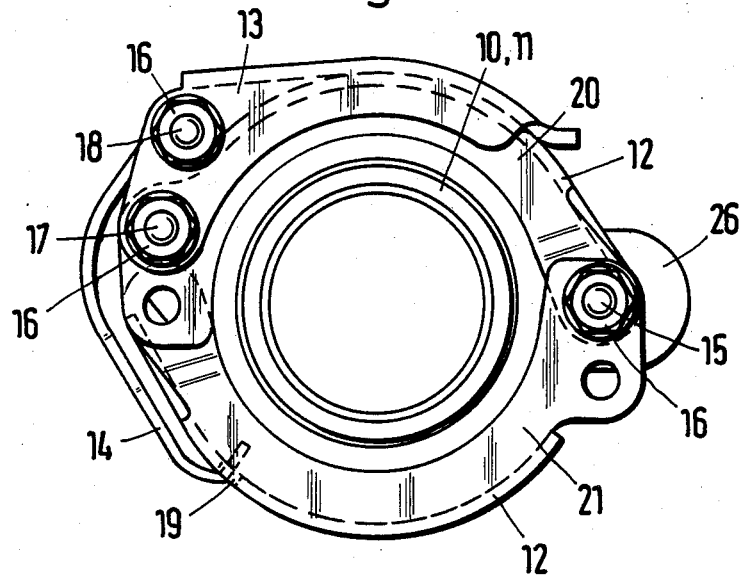
FIG. 2 is a view from one side.
Figure 3:
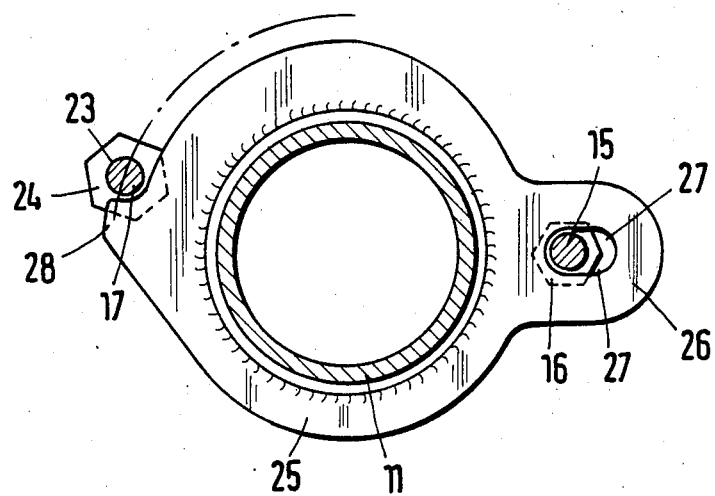
FIG. 3 is a section along line III—III in FIG. 1.

The center portion of the coupling consists of a socket 10 and a connecting flange 11 extending coaxially therewith. The tube is clamped to the socket by means of a pair of shell portions 12 and a locking mechanism composed of bolt lever 13 and spring mechanism 14.

Shell portions 12 are each flexibly linked at one end thereof by joint bolt 15 secured at said ends by means of nuts 16. Bolt or clamping lever 13 is fixed by means of a further joint bolt 17 at the end portion of one of shell portions 12, while still another joint bolt 18 is used to fasten one end of spring mechanism 14. The other end of spring mechanism 14 engages recess 19 located in one of shell portions 12. Joint bolts 17 and 18 are joined in screwed connection by means of nuts 16.

Shell portions 12 are provided at each side thereof with inwardly extending support flanges 20 and 21. Support flanges 20 are part of upper shell portion 12, while support flanges 21 are part of lower shell portion 12. Support flanges 20, 21 press a tube (not shown) against socket 10.

At the side adjacent the connecting flange 11, the joint bolt 17 is extended and has an annularly reduced portion 23 and a hexagonal head 24. Onto connecting flange 11 is welded a guide flange 25 having the form of a closed circumferential ring. In its area correlated to joint bolt 15 guide flange 25 is provided with a radially outside extending web portion 26 comprising a radially extending oblong hole 27. In said oblong hole 27 joint bolt 15 and shell portions 12 are radially movable.

The form of guide flange 25 is selected such that at least in the final section of the closing movement, said guide flange 25 engages the position 23 until reaching the closing position shown in the drawing. This permits simultaneous axial and radial guidance. At a location corresponding to the closing position, guide flange 25 is provided with a radially outside extending projection 28 serving as an end stop on which joint bolt 17 and portion 23 rest when the closing position is reached. Guide flange 25 may be dimensioned such that said end stop substantially only acts in the circumferential direction while in the radial direction there still remains some clearance in order to permit automatic adjustment between shell portions 12 and socket 10 or connecting flange 11.

As shown in FIG. 1, support flanges 20, 21 of shell portions 12 overlap in the area of joint bolt 17 to such an extent that in the closing position of the coupling the inner support flange 21 of lower shell portion 12 rests on joint bolt 17. This ensures that a definite bearing surface for the closing position does not only exist in the area of projection 28 but also at the opposite side of shell portions 12 thus ensuring an appropriate uniformity of support.

Below joint bolt 17, support flanges 20 and 21 are provided with an aperture 29 for passng a locking pin (not shown). The provision of a bearing for support flange 21 of lower shell portion 12 in the overlapping area ensures that in the closing position, apertures 29 perfectly concord with each other and that a locking pin may be inserted without any difficulty.

I claim:

1. A tube coupling comprising: a pair of shells, a first extension joint bolt pivotally linking the shells, wherein said pair of shells have laterally extending clamping flanges, locking means for closing the shells comprising a clamping lever, a spring mechanism, a second extension bolt joint joining the clamping lever to one of the pair of shells and comprising a guide flange having the shape of a closed ring, a connecting socket, said guide flange being connected to the connecting socket and located adjacent to said pair of shells and comprising an at least approximately radial web crossed by the extension joint bolt connecting said pair of shells, and forming an external guide extending in circumferential direction for an extended end of the extension joint bolt linking said clamping lever with one of the pair of shells, said extension joint bolt end comprising a guide head terminating in an annularly reduced portion and said guide flange engaging said portion in a position spaced by at least 90° from a closing position of the coupling, wherein said extended end of extension joint bolt is guided in the area of its reduced portion on the radially outer surface of said guide from said spaced position to a closed position of said shells flange and a recess is provided in the area of the web as a crosspassage for the first extension joint bolt and has a shape of a radially extending oblong hole.

2. A tube coupling of claim 1, wherein said guide flange comprises an at least approximately radially extending shoulder as a circumferential end stop for the extension joint bolt extension in the closing position of the coupling.

3. A tube coupling of claim 1, wherein at the side adjacent the guide flange each inner overlapping clamping flange of the pair of shells rests on said second extended joint bolt.

4. A tube coupling of claim 3, wherein the clamping flanges of the pair of shells are provided in the overlapping area with aligned bores for insertion of a safety pin.

* * * * *

UNITED STATES PATENT AND TRADEMARK OFFICE
CERTIFICATE OF CORRECTION

PATENT NO. : 4,659,120
DATED : April 21, 1987
INVENTOR(S) : Karl Weinhold

It is certified that error appears in the above-identified patent and that said Letters Patent is hereby corrected as shown below:

Col. 3, line 30            Delete "position" before "23" and substitute --portion--
Col. 4, line 4             Correct spelling of --passing--
Col. 4, line 32            After "guide" insert --flange--
Col. 4, line 33            After "shells" delete "flange"

Signed and Sealed this

Twenty-seventh Day of October, 1987

Attest:

DONALD J. QUIGG

Attesting Officer            Commissioner of Patents and Trademarks